United States Patent
Ciesinger

(10) Patent No.: US 7,702,921 B2
(45) Date of Patent: Apr. 20, 2010

(54) LOADING MEDIA DATA INTO A PORTABLE DATA CARRIER

(75) Inventor: Daniel Ciesinger, München (DE)

(73) Assignee: Giesecke & Devrient GmbH (DE)

( * ) Notice: Subject to any disclaimer, the term of this patent is extended or adjusted under 35 U.S.C. 154(b) by 613 days.

(21) Appl. No.: 10/548,996

(22) PCT Filed: Mar. 8, 2004

(86) PCT No.: PCT/EP2004/002404

§ 371 (c)(1),
(2), (4) Date: Oct. 25, 2006

(87) PCT Pub. No.: WO2004/082234

PCT Pub. Date: Sep. 23, 2004

(65) Prior Publication Data

US 2007/0038870 A1    Feb. 15, 2007

(30) Foreign Application Priority Data

Mar. 10, 2003    (DE) .................. 103 10 351

(51) Int. Cl.
  *H04L 9/32*    (2006.01)
  *G06F 7/04*    (2006.01)
  *G06F 17/30*    (2006.01)

(52) U.S. Cl. .............. 713/193; 713/168; 713/169; 713/170; 713/171; 713/172; 380/201; 380/202; 380/203; 726/4; 726/5; 726/6; 726/7; 726/8

(58) Field of Classification Search ............... 713/193
See application file for complete search history.

(56) References Cited

U.S. PATENT DOCUMENTS 5,625,695 A    4/1997    M'Raihi et al.

(Continued)

FOREIGN PATENT DOCUMENTS

EP    0 656 710    6/1995

(Continued)

OTHER PUBLICATIONS

Abstract of Japanese Patent Publication No. 2001-028572, Pub. Date: Jan. 30, 2001, Patent Abstracts of Japan.

(Continued)

*Primary Examiner*—Longbit Chai
(74) *Attorney, Agent, or Firm*—Martine Penilla & Gencarella, LLP

(57) ABSTRACT

In a method for loading media data (M) into a memory of a portable data carrier (10) connected to an external operator device (24), the data carrier (10) receives a loading job, an encrypted data transfer channel (50) is set up between the data carrier (10) and a trustworthy, non-local server (30) on which the media data (M) are held, and the media data (M) are transferred in encrypted form via the data transfer channel (50) and written to the memory of the data carrier (10). A data carrier (10) and a computer program product have corresponding features. In addition, an operator device (24) and a computer program product are provided that are configured to provide a user interface for initiating the method for loading the media data (M). The invention provides a technique for loading media data (M) into a portable data carrier (10), which technique prevents unauthorized copying of the media data (M).

23 Claims, 2 Drawing Sheets

U.S. PATENT DOCUMENTS

| | | | |
|---|---|---|---|
| 6,999,948 B1 | 2/2006 | Hatanaka et al. | |
| 7,194,545 B2 | 3/2007 | Urien | |
| 7,278,166 B2 * | 10/2007 | Inokuchi et al. | 726/28 |
| 2003/0070083 A1 * | 4/2003 | Nessler | 713/193 |
| 2005/0195975 A1 * | 9/2005 | Kawakita | 380/30 |

FOREIGN PATENT DOCUMENTS

| | | |
|---|---|---|
| EP | 1 039 719 | 9/2000 |
| EP | 1 164 747 | 12/2001 |
| EP | 1 237 324 | 9/2002 |
| EP | 1 276 106 | 1/2003 |
| EP | 1 288 942 | 3/2003 |
| JP | 10-222468 | 8/1998 |
| JP | 2001-005884 | 1/2001 |
| JP | 2001-028572 | 1/2001 |
| JP | 2001-236232 | 8/2001 |
| JP | 2001-257670 | 9/2001 |
| JP | 2001-282626 | 10/2001 |
| JP | 2001-306401 | 11/2001 |
| JP | 2002-009966 | 1/2002 |
| JP | 2002-099514 | 4/2002 |
| JP | 2002-196983 | 7/2002 |
| JP | 2003-030613 | 1/2003 |
| WO | WO 00/29928 | 5/2000 |
| WO | WO 01/13358 | 2/2001 |
| WO | WO 01/41356 | 6/2001 |
| WO | WO 01/60026 | 8/2001 |
| WO | WO 01/67258 | 9/2001 |
| WO | WO 01/95206 | 12/2001 |
| WO | WO 02/48846 | 6/2002 |
| WO | WO 02/086725 | 10/2002 |
| WO | WO 03/005145 | 1/2003 |

OTHER PUBLICATIONS

C. Gleich, "Das Gigabyte im Geldbeutel," *c't magazine*, Heise-Verlag, Issue Aug. 2002, pp. 164-166.

C. Gleich, "Blitzgescheit," *c't magazine*, Heise-Verlag, Issue Aug. 2002, pp. 168-172.

Abstract of Japanese Patent Publication No. 2002-009966, Pub. Date: Jan. 11, 2002, Patent Abstracts of Japan.

Abstract of Japanese Patent Publication No. 2002-099514, Pub. Date: Apr. 5, 2002, Patent Abstracts of Japan.

Abstract of Japanese Patent Publication No. 2002-196983, Pub. Date: Jul. 12, 2002, Patent Abstracts of Japan.

Abstract of Japanese Patent Publication No. 2003-030613, Pub. Date: Jan. 31, 2003, Patent Abstracts of Japan.

Abstract of Japanese Patent Publication No. 10-222468, Pub. Date: Aug. 21, 1998, Patent Abstracts of Japan.

Abstract of Japanese Patent Publication No. 2001-005884, Pub. Date: Jan. 12, 2001, Patent Abstracts of Japan.

Abstract of Japanese Patent Publication No. 2001-236232, Pub. Date: Aug. 31, 2001, Patent Abstracts of Japan.

Abstract of Japanese Patent Publication No. 2001-257670, Pub. Date: Sep. 21, 2001, Patent Abstracts of Japan.

Abstract of Japanese Patent Publication No. 2001-282626, Pub. Date: Oct. 12, 2001, Patent Abstracts of Japan.

Abstract of Japanese Patent Publication No. 2001-306401 Pub. Date: Nov. 2, 2001, Patent Abstracts of Japan.

\* cited by examiner

1

LOADING MEDIA DATA INTO A PORTABLE DATA CARRIER

BACKGROUND OF THE INVENTION

1. Field of the Invention

The invention relates generally to portable data carriers, such as smart cards or compact memory modules of various types. More specifically, the invention relates to the loading of media data, such as image data or audio data or video data, into such data carriers.

2. Description of the Related Art

Portable data carriers for the storage of media data are well known in various forms. The article entitled "Das Gigabyte im Geldbeutel" by Clemens Gleich in c't magazine, Heise-Verlag, Issue Aug. 2002, pages 164 to 166, gives an overview of the products currently offered under the trademarks and trade names CompactFlash, SmartMedia, Memory Stick, Secure Digital and MultiMediaCard. A version of the Memory Stick called Magic Gate and also the Secure Digital cards have digital rights management systems to prevent unauthorized copying of the media data. Such systems are described in the article "Blitzgescheit" by Clemens Gleich in c't magazine, Heise-Verlag, Issue August 2002, pages 168 to 172, especially in the box on page 169.

The problem of copy protection for media data that is secure but at the same time does not interfere with legitimate use has still not been satisfactorily solved, however. Security vulnerabilities exist, for example, when the user downloads media data onto the data carrier from a server of the rights holder. The user will usually use for this an Internet browser to access the server and store the media data intermediately on a personal computer belonging to the user. It is only in a second step that the media data are then exported to the data carrier. The media data stored in the user's personal computer are unprotected, however, and can easily be duplicated.

Other general problems of the prior art are concerned with the difficulty of reliable authentication of the eventual recipient of the media data with the server and the difficulty of secure key management.

SUMMARY OF THE INVENTION

An object of the invention is to solve the problems mentioned, at least to some extent. In particular, the invention is intended to provide a technique for loading media data into a portable data carrier, which technique as far as possible prevents unauthorized copying of the media data. Preferably, the invention is to be as user-friendly as possible in its application.

According to an aspect of the invention, a method is provided for loading media data into a memory of a portable data carrier connected to an external operator device, the method comprising:

- receiving by the data carrier of a loading job from the operator device,
- setting-up of an encrypted data transfer channel between the data carrier and a trustworthy, non-local server on which the media data are held, and
- encrypted transfer of the media data via the data transfer channel, and writing of the media data to the memory of the data carrier.

According to a further aspect of the invention, a portable data carrier is provided, the data carrier having a processor core and a memory, the processor core being configured for loading media data into the memory, wherein:

- the data carrier receives a loading job from an external operator device,
- an encrypted data transfer channel is set up between the data carrier and a trustworthy, non-local server on which the media data are held, and
- the media data are transferred in an encrypted fashion via the data transfer channel, and the media data are written to the memory of the data carrier.

According to yet another aspect of the invention, a computer program product is provided, the computer program product having program instructions for causing a processor core of a portable data carrier to carry out a method for loading media data into a memory of the data carrier, the method comprising:

- receiving by the data carrier of a loading job from the operator device,
- setting-up of an encrypted data transfer channel between the data carrier and a trustworthy, non-local server on which the media data are held, and
- encrypted transfer of the media data via the data transfer channel and writing of the media data to the memory of the data carrier.

According to yet a further aspect of the invention, an operator device is provided, the operator device being configured to provide a user interface for initiating an operation for loading media data into a memory of a data carrier connected to the operator device, the operation comprising:

- communicating a loading job from the operator device to the data carrier,
- setting-up of an encrypted data transfer channel between the data carrier and a trustworthy, non-local server on which the media data are held, and
- encrypted transfer of the media data via the data transfer channel and writing of the media data to the memory of the data carrier.

According to yet a further aspect of the invention, a computer program product is provided, the computer program product having program instructions for causing an operator device to provide a user interface for initiating an operation for loading media data into a memory of a data carrier connected to the operator device, the operation comprising:

- communicating a loading job from the operator device to the data carrier,
- setting-up of an encrypted data transfer channel between the data carrier and a trustworthy, non-local server on which the media data are held, and
- encrypted transfer of the media data via the data transfer channel and writing of the media data to the memory of the data carrier.

The order in which the steps are listed in the method claims is not to be understood as constituting any limitation of the scope of protection. On the contrary, embodiments of the invention are envisaged in which those steps of the method are performed in a different order or completely or partially in parallel or are completely or partially interleaved. That applies especially to the steps of transferring the media data via the data transfer channel and of writing the media data to the memory of the data carrier, which are normally carried out together.

The invention proceeds from the basic idea of providing the data carrier with a functionality for setting up an encrypted data transfer channel with a trustworthy, non-local server. Owing to the encryption, the media data transferred over the channel are also protected when the data transfer channel physically goes via a non-trustworthy device. Although the encrypted data may possibly be duplicated, without knowledge of the key used they are useless to a pirate. At the logic level, the data transfer channel accordingly constitutes preferably a direct connection between the non-local server and the data carrier, the connection being protected against spying.

The teaching of the invention provides a reliable and secure method of loading the media data onto the portable data carrier. This prevents losses due to unauthorized copies and increases the willingness of rights holders to offer media data via innovative distribution channels. Convenience for the legitimate user is not adversely affected by the invention; on the contrary, it is possible for the operations according to the invention to be carried out automatically and therefore in a way that is easier for the user than the previous manual operations. Especially great ease of use may be afforded if a user interface is provided for initiating the loading operation from a browser running on the operator device.

In preferred embodiments, the data carrier and the server communicate with each other via at least one Internet protocol. The latter is to be understood as including especially the protocols TCP/IP (Transmission Control Protocol/Internet Protocol), UDP/IP (User Datagram Protocol/Internet Protocol), IPSec (IP Security Protocol), TLS (Transport Layer Security), SSL (Secure Sockets Layer), HTTP (Hypertext Transfer Protocol) and S-HTTP (Secure HTTP). Those protocols are well known per se and are described in detail in the relevant RFC standards and in other standards documents. The mentioned protocols as such are not the subject of the present invention.

Preferably, a session key is used for the encrypted communication on the data transfer channel. It is advantageous to have regard for secure spying protection also when agreeing on the session key. For that purpose it may be provided, for example, that one of the communication partners—either the data carrier or the server—generates the session key and then encrypts it with a public key of the other communication partner and sends it to that other communication partner. The session key is thereby kept secret from an unauthorized eavesdropper—for example from the operator device not regarded as being trustworthy through which the data transfer physically proceeds.

The computer program product according to the invention has program instructions for implementing the method according to the invention in a data carrier and for providing the necessary functionality of the operator device. Such a computer program product may be a physical medium, for example a semiconductor memory or a diskette or a CD-ROM. The computer program product may, however, alternatively be a non-physical medium, for example a signal transmitted via a computer network. With respect to the data carrier, the computer program product may be a data carrier operating system or a part thereof.

The portable data carrier, the computer program product and the operator device have, in preferred developments, features corresponding to those mentioned above and/or to those mentioned in the dependent method claims.

BRIEF DESCRIPTION OF THE DRAWINGS

Further features, objects and advantages of the invention will be apparent from the following description of an illustrative embodiment and a number of alternative embodiments. Reference will be made to the schematic drawings, in which.

DETAILED DESCRIPTION OF EXEMPLARY EMBODIMENTS

Figure 1:
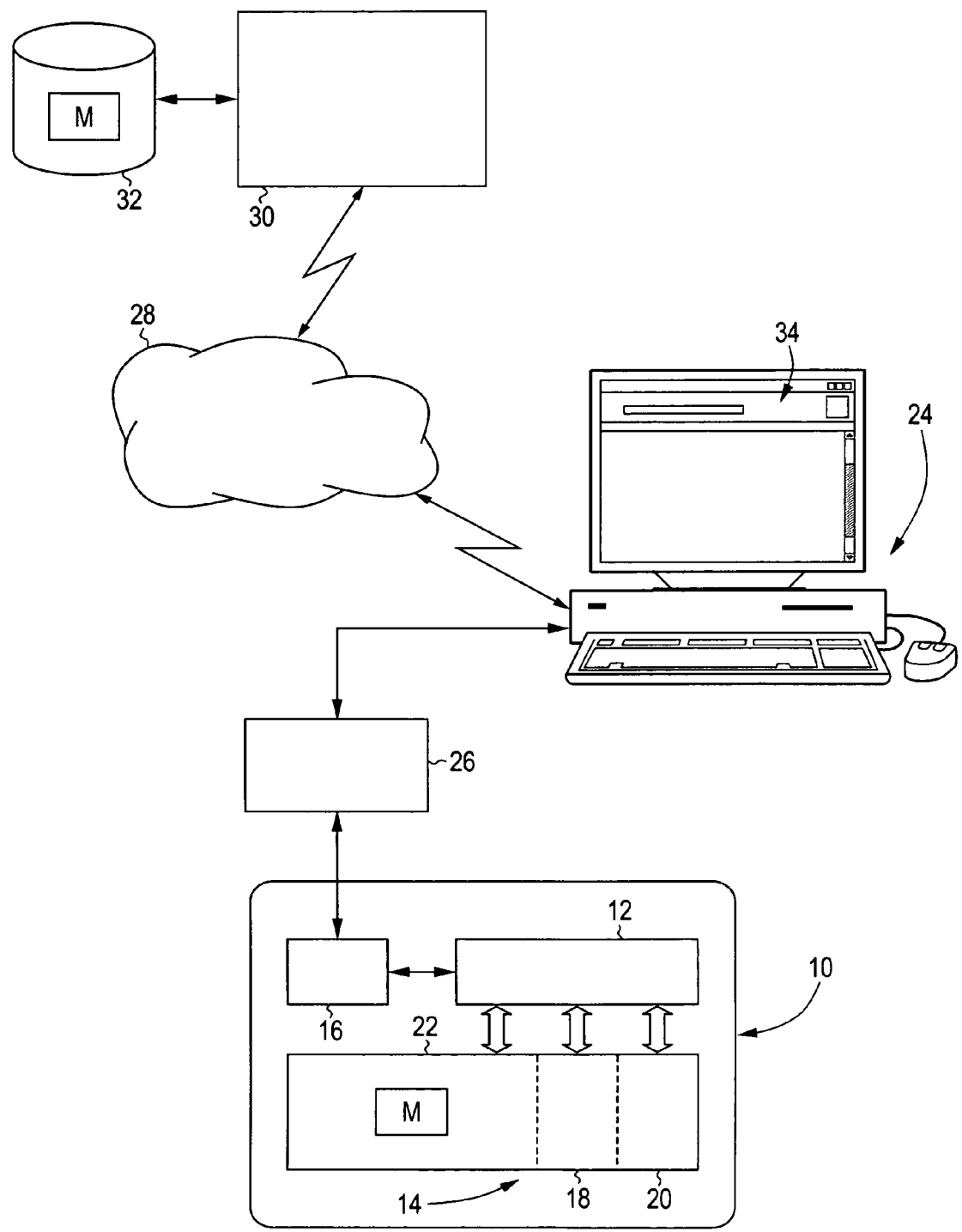
FIG. 1 is a block diagram showing components that are involved in the operation of loading media data into a data carrier.

FIG. 1 shows a portable data carrier 10 which, for example, is in the form of a chip card or a compact chip module. In particular, the data carrier 10 may be compatible with one or more of the products known under the trademarks and trade names CompactFlash, SmartMedia, Memory Stick, MultiMediaCard and Secure Digital, and may therefore be suitable for use in play-back devices that are currently available commercially.

In a manner known per se, the data carrier 10 has a semiconductor chip on which a processor core 12, a memory 14 and an interface 16 for wired or wireless communication are formed. The memory 14 has a plurality of different areas, these being in the illustrative embodiment under consideration a read-only memory 18 in the form of a mask-programmed ROM, a working memory 20 in the form of RAM, and a writable memory 22 in the form of an EEPROM or FLASH memory. In a manner known per se, the read-only memory 18 contains control programs for the processor core 12 of the data carrier 10. The working memory 20 is used for holding values temporarily, and the writable memory 22 is envisaged especially for the storage of media data M, for example image data or audio data or video data.

In the illustrative embodiment described herein, the data carrier 10 does not have its own operating and display elements. Rather, an external operator device 24 is provided which, in the illustrative embodiment under consideration, is in the form of a personal computer with output means, such as a screen, and input means, such as a keyboard and a mouse. In alternative embodiments, the operator device 24 is a compact device, for example a handheld computer, a personal digital organiser, a mobile telephone or an operating and playing device also configured to play back the media data M.

A connection device 26 makes communication possible between the operator device 24 and the data carrier 10 or, to be more precise, its interface 16. The connection device 26 may be an external device into which the data carrier 10 is inserted or placed or that—in the case of wireless communication—is merely brought into the vicinity of the data carrier 10. For connection of the connection device 26 to the operator device 24 a conventional interface, for example USB or PCMCIA (PC Card), or a local network may be used. Alternatively, the connection device 26 may also be permanently integrated in the operator device 24.

The operator device 24 is further configured to establish a connection to a network 28, here a wide area network (WAN). The network 28 may, for example, be the Internet, into which the operator device 24 dials via a telephone line or a DSL connection. In particular, when the operator device 24 has the functionality of a mobile telephone, the network 28 may also be a network provided for data transmission by radio, for example a GPRS or UMTS network. Via the network 28 it is possible to access a non-local server 30 which in turn is capable of accessing the media data M stored in a file system 32.

The non-local server 30 is regarded as being trustworthy by the holder of the rights to the media data M. The data carrier 10 also is considered to be trustworthy since it has suitable precautionary features—known per se—to prevent unauthorized copying of the media data M held in the writable memory 22. The operator device 24, on the other hand, cannot necessarily be regarded as being trustworthy. To prevent the media data M from being intermediately stored in unencrypted form in the operator device 24—and possibly being illegally duplicated—the data carrier 10 is configured to set up an encrypted data transfer channel with the non-local server 30.

The encrypted data transfer channel physically goes via the connection device 26 and the operator device 24 since the latter are required as intermediate stations for connection of the data carrier 10 to the network 28. The data transfer channel may also be directed in the network 28 via any number of non-trustworthy devices—for example routers and proxies. Owing to the encryption, however, the data transfer channel constitutes logically a direct and spying-protected connection between the non-local server 30 and the data carrier 10.

In the illustrative embodiment described herein, in which the network 28 is the Internet, the data carrier 10 comprises a suitable implementation of an Internet protocol stack in order to establish the encrypted data transfer channel with the server 30. In the illustrative embodiment under consideration, the TCP/IP Internet protocol is used for the transport and network layer, and the HTTP Internet protocol is used for the application layer, a security layer that uses SSL being placed on top of the transport layer. The operator device 24 is in each case so configured that—similarly to a router or a proxy—it mediates a data exchange of the data carrier 10 with the network 28 via TCP/IP. In alternative embodiments, other Internet protocols are used for data exchange and, in particular, for making the data transfer channel secure.

In order to provide a user interface for the data carrier 10, the operator device 24 runs an Internet browser known per se of the kind available, for example, under the trademark Microsoft Internet Explorer. In FIG. 1, that browser is shown symbolically by a browser window 34 displayed on the screen of the operator device 24. In the illustrative embodiment under consideration, the browser communicates with the data carrier 10 via a simple protocol. For example, the data carrier 10 may receive from the operator device 24 commands in the form of read or write instructions for a file system contained in the data carrier 10. In alternative embodiments, communication between the operator device 24 and the data carrier 10 is via Internet protocols such as TCP/IP and HTTP; the data carrier 10 then has the functionality of a simple web server for the browser running on the operator device 24.

Figure 2:
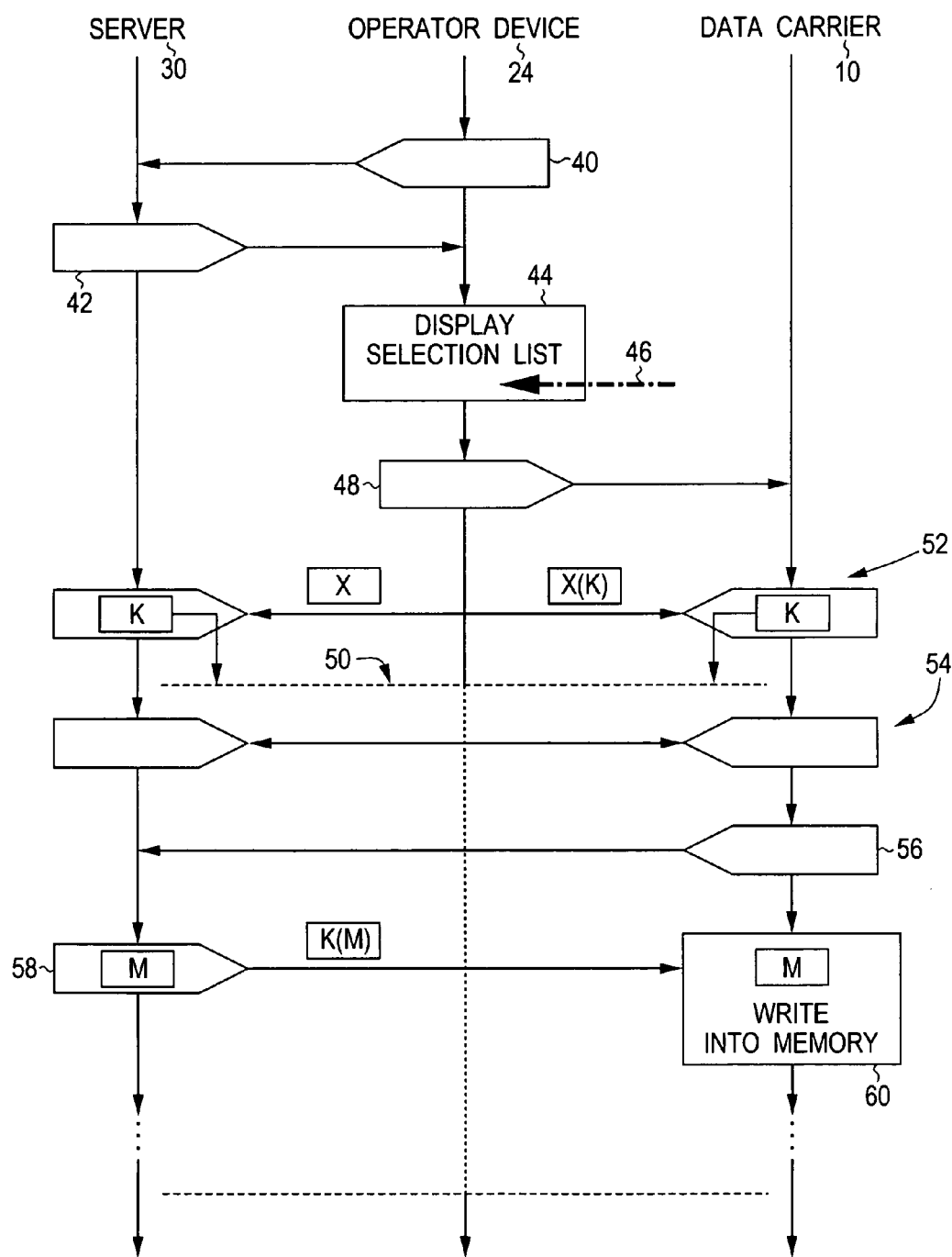
FIG. 2 is an example of a flow diagram of a loading operation.

FIG. 2 shows an example of an operation in which media data M are loaded from the server 30 into the data carrier 10. After authentication of the data carrier 10 with the server 30 or after mutual authentication, the user first requests from the server 30 via the browser running on the operator device 24 a selection page containing the media data M offered. For that purpose, in step 40, the operator device 24 sends a corresponding HTTP-GET instruction to the server 30. In step 42, the server 30 responds by sending an HTTP response with the desired selection page to the operator device 24. That selection page, which is written in a suitable page description language, such as HTML, is evaluated by the browser running on the operator device 24 and, in step 44, is displayed on the screen of the operator device 24.

The user initiates the loading operation of the desired media data M onto the data carrier 10 by a mouse click 46. The operator device 24 then communicates the loading job to the data carrier 10 in step 48. That step may be executed directly by the browser or by a suitable add-on program, for example a browser plug-in. It is also possible in all the embodiments mentioned for further communication operations to take place between steps 46 and 48, in which operations, for example, the user approves the loading operation and authorizes payment of an agreed sum—for example by debiting a credit card—via the operator device 24.

In response to the loading job received in step 48, the data carrier 10 then interacts with the server 30 to set up an encrypted data transfer channel 50 for the transfer of the media data M. In the illustrative embodiment under consideration, which uses SSL as the security layer, first a so-called "hello phase" is carried out. Then, in a sequence of steps summarized in FIG. 2 by reference numeral 52, authentication is carried out, in which, for example, first the server 30 authenticates itself with the data carrier 10 and then the data carrier 10 authenticates itself with the server 30. The latter authentication process in particular is important for the security of the method described herein, since otherwise a non-trustworthy device or program could pose as the data carrier 10 to the server 30.

Thereafter, a public key X of the server 30 is communicated to the data carrier 10. The data carrier 10 then generates a random session key K, encrypts it with the public key X of the server 30 and transmits the thus encrypted session key X(K) to the server 30. The server 30 uses a private key, which is complementary to the public key X, to extract the session key K from X(K) again. Those steps are summarized in FIG. 2 by reference numeral 54.

As a result of the steps 54, both the server 30 and the data carrier 10 then know the session key K. Since that session key K was never transmitted in plain text, it is not known to the operator device 24 via which the entire communication between the server 30 and the data carrier 10 proceeds. The data exchanged between the data carrier 10 and the server 30 in the communication steps that follow are all encrypted with the session key K, and therefore the operator device 24 would be able at most to duplicate the encrypted—and therefore useless—data.

In order to begin the actual transfer of the media data M, in step 56 the data carrier 10 sends an HTTP-GET instruction containing the file name of the desired media data M that was transferred to the data carrier 10 in step 48. The server 30 responds in step 58 by sending the media data M in the form of an HTTP response via the data transfer channel 50 to the data carrier 10. The data sent are encrypted with the session key K. The data carrier 10 receives the encrypted data K(M) and extracts therefrom the original media data M, which are written in step 60 into the writable memory 22 of the data carrier 10. Steps 56 to 60 may be repeated as often as desired to transfer several sets of media data M.

To play back the media data M, the data carrier 10 is placed or inserted into a suitable play-back device (not shown in the Figures). The data carrier 10 is so configured that it outputs the media data M stored in it to the play-back device only when the latter has successfully authenticated itself with the data carrier 10. In that manner, the data carrier 10 is prevented from outputting the media data M to non-trustworthy devices that possibly allow the unauthorized production of copies. In one variant, the operator device 24, for example the computer shown in FIG. 1 or the other devices mentioned above, may also be used as a play-back device if those devices have suitable means for copy protection and are able to authenticate themselves with the data carrier 10.

What is claimed is:

1. A method for loading media data into a memory of a portable data carrier connected to an external operator device, wherein the portable data carrier is one of a portable card device and a portable memory module device, wherein the media data comprise at least one of image and audio and video content, the method comprising:

receiving by the portable data carrier of a loading job from the operator device, in response to receiving the loading job, the portable data carrier setting up an encrypted data transfer channel between the portable data carrier and a trustworthy, non-local server on which the media data are held, wherein the encrypted data transfer channel constitutes logically a direct connection between the non-local server and the portable data carrier, and encrypted transfer of the media data via the data transfer channel and writing of the media data to the memory of the portable data carrier.

2. A method according to claim 1, wherein the data carrier and the server communicate with each other via an Internet protocol.

3. A method according to claim 1, wherein a session key agreed between the data carrier and the server in a process that is spying-protected at least from the operator device is used for the encrypted transfer of the media data.

4. A method according to claim 3, wherein the session key is generated by a device from the group formed by the data carrier and the server, and the session key is then encrypted with a public key of the other device from said group and is sent in encrypted form to that other device.

5. A method according to claim 1, wherein the data transfer channel physically goes via the operator device.

6. A method according to claim 1, wherein a browser is run by the operator device in order to provide a user interface for initiating the loading operation.

7. A method according to claim 1, wherein the media data stored in the portable data carrier are played back in a play-back device only after successful authentication of the play-back device with the portable data carrier.

8. The method according to claim 1, wherein the data carrier and the server communicate with each other via at least one of the protocols TCP/IP, UDP/IP, IPSec, TLS, SSL and HTTP.

9. A portable data carrier having a processor core and a memory, wherein the portable data carrier is one of a portable card device and a portable memory module device, the portable data carrier being configured for loading media data into the memory, wherein the media data comprise at least one of image and audio and video content, wherein:

the portable data carrier receives a loading job from an external operator device, in response to receiving the loading job, the portable data carrier sets up an encrypted data transfer channel between the portable data carrier and a trustworthy, non-local server on which the media data are held, wherein the encrypted data transfer channel constitutes logically a direct connection between the non-local server and the portable data carrier, and the media data are transferred in an encrypted fashion via the data transfer channel and the media data are written to the memory of the portable data carrier.

10. The portable data carrier according to claim 9, wherein the data carrier is free of operating and display elements.

11. The portable data carrier according to claim 9, wherein the data carrier and the server communicate with each other via at least one of the protocols TCP/IP, UDP/IP, IPSec, TLS, SSL and HTTP.

12. The portable data carrier according to claim 9, wherein a session key agreed between the data carrier and the server in a process that is spying-protected at least from the operator device is used for the encrypted transfer of the media data.

13. The portable data carrier according to claim 9, wherein the data transfer channel physically goes via the operator device.

14. A computer-readable storage medium having program instructions stored thereon, the program instructions causing a processor core of a portable data carrier to carry out a method for loading media data into a memory of the portable data carrier, wherein the portable data carrier is one of a portable card device and a portable memory module device, wherein the media data comprise at least one of image and audio and video content, the method comprising:

receiving by the portable data carrier of a loading job from the operator device, in response to receiving the loading job, the portable data carrier setting up an encrypted data transfer channel between the portable data carrier and a trustworthy, non-local server on which the media data are held, wherein the encrypted data transfer channel constitutes logically a direct connection between the non-local server and the portable data carrier, and encrypted transfer of the media data via the data transfer channel and writing of the media data to the memory of the portable data carrier.

15. An operator device, that is configured to provide a user interface for initiating an operation for loading media data into a memory of a portable data carrier connected to the operator device, wherein the portable data carrier is one of a portable card device and a portable memory module device, wherein the media data comprise at least one of image and audio and video content, the operation comprising:

communicating a loading job from the operator device to the portable data carrier, in response to receiving the loading job, the portable data carrier setting up an encrypted data transfer channel between the portable data carrier and a trustworthy, non-local server on which the media data are held, wherein the encrypted data transfer channel constitutes logically a direct connection between the non-local server and the portable data carrier, and encrypted transfer of the media data via the data transfer channel and writing of the media data to the memory of the portable data carrier.

16. The operator device according to claim 15, wherein the operator device is a personal computer.

17. The operator device according to claim 15, wherein the data transfer channel physically goes via the operator device.

18. The operator device according to claim 15, wherein a browser is run by the operator device in order to provide the user interface for initiating the loading operation.

19. The operator device according to claim 15, wherein the media data stored in the data carrier are played back in a play-back device only after successful authentication of the play-back device with the data carrier.

20. A computer-readable storage medium having program instructions stored thereon, the program instructions causing an operator device to provide a user interface for initiating an operation for loading media data into a memory of a portable data carrier connected to the operator device, wherein the portable data carrier is one of a portable card device and a portable memory module device, wherein the media data comprise at least one of image and audio and video content, the operation comprising:

communicating a loading job from the operator device to the portable data carrier, in response to receiving the loading job, the portable data carrier setting up an encrypted data transfer channel between the portable data carrier and a trustworthy, non-local server on which the media data are held, wherein the encrypted data transfer channel constitutes logically a direct connection between the non-local server and the portable data carrier, and encrypted transfer of the media data via the data transfer channel and writing of the media data to the memory of the portable data carrier.

21. The computer program product according to claim 20, wherein the operator device is a personal computer.

22. The computer program product according to claim 20, wherein the data transfer channel physically goes via the operator device.

23. The computer program product according to claim 20, wherein a browser is run by the operator device in order to provide the user interface for initiating the loading operation.

* * * * *